June 3, 1958 L. D. COBB 2,837,188
ONE-WAY CLUTCH
Filed Feb. 18, 1954

INVENTOR:
LELAND D. COBB.
BY Edward H. Goodrich
HIS ATTORNEY.

United States Patent Office 2,837,188
Patented June 3, 1958

2,837,188
ONE-WAY CLUTCH

Leland D. Cobb, Forestville, Conn., assignor to General Motors Corporation, Detroit, Mich., a corporation of Delaware Application February 18, 1954, Serial No. 411,052

7 Claims. (Cl. 192—45.1)

This invention relates to one-way clutches and particularly to a clutch wherein grippers are guided in full phasing relation into and out of uni-directional driving connection between a pair of relatively rotatable members.

Tiltable gripper-type clutches have heretofore been proposed wherein a series of circumferentially spaced grippers, arranged for engagement with a pair of spaced annular raceways, have been guided by one or more cages supported by at least one of the raceways, and an elongated coiled spring has been threaded through the grippers to urge them toward clutch-engaging positions. In such an arrangement, the assembly of the clutch has been difficult and the frictional drag of the cages against the raceways has often produced objectionable year and heating of the parts with the result that after a short period of heavy duty use a full driving load might be assumed by only a few of the grippers causing short clutch life and early clutch failure.

It is, therefore, an object of this invention to provide a uni-directional driving connection between a pair of relatively rotatable coaxial circular surfaces embodying an improved unit-handling one-way clutch having circumferentially spaced grippers under simultaneous control wherein each gripper will assume an equal portion of the clutch driving load.

Another object is to provide an improved unit-handling one-way clutch assembly wherein a plurality of circumferentially spaced grippers are easily snapped into and out of assembled relation within a cage arrangement which simultaneously controls a unified shifting of the grippers towards or from operative positions.

A further object of this invention is to provide an improved unit-handling one-way clutch assembly of compact, simple and economical construction wherein cage-guided grippers are engaged by cage-supported members that resiliently urge the grippers simultaneously towards operative positions.

To these ends and also to improve generally upon devices of this character, this invention consists in the various matters hereinafter described and claimed. In its broader aspects, the invention is not necessarily limited to the specific structure selected for illustrative purposes in the accompanying drawings wherein.

Figure 1:
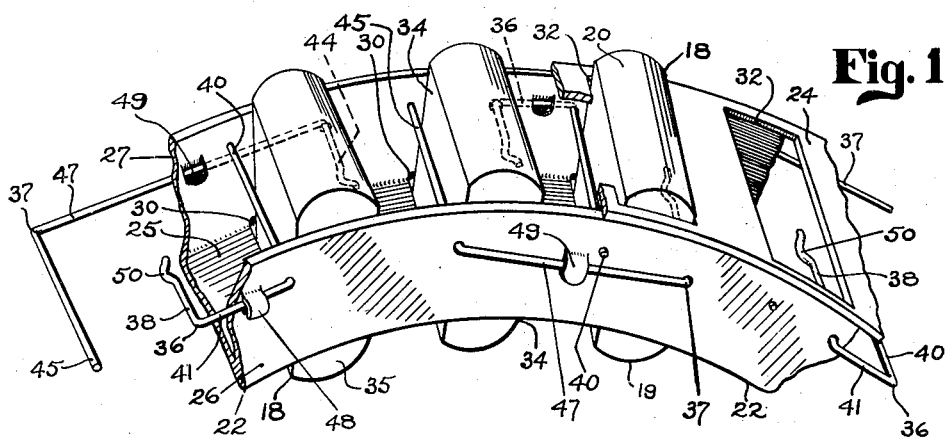
Figure 1 is a fragmentary enlarged perspective view with some parts cut away to illustrate the construction of my invention.
Figures 2, 3:
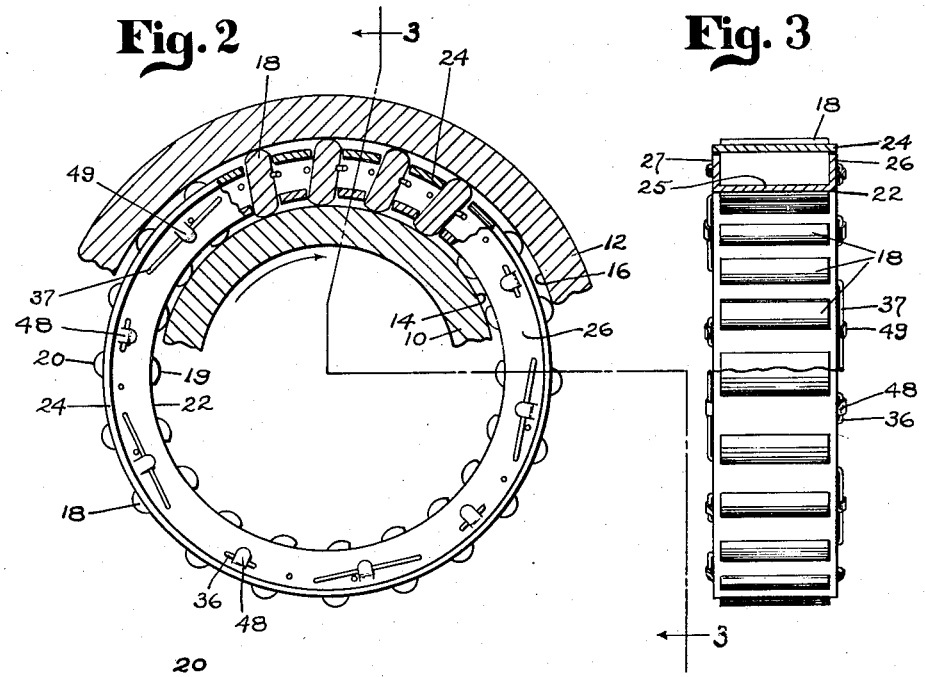
Figure 2 is a fragmentary end elevation with some parts in section.
Figure 3 is a side elevation with some parts in section and taken substantially along the broken line of 3—3 of Figure 2.
Figure 4:
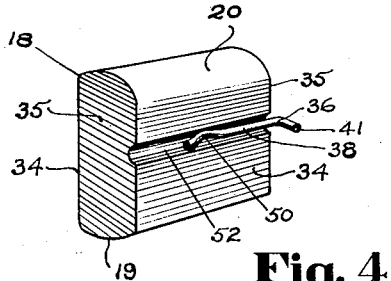
Figure 4 is a perspective view of one of the grippers and showing a portion of the spring fingers which urges the gripper towards operating position.

My unit-handling clutch assembly is arranged to transmit a one-way driving connection between a pair of relatively rotatable members, as a driving race ring 10 and a driven race ring 12, these rings being suitably held in coaxial relation and having concentric cylindrical surfaces 14 and 16. The one-way clutched driving engagement is effected through circumferentially spaced grippers or sprags 18 that are provided with arcuate inner and outer operative faces 19 and 20 arranged to be shifted in unison into and out of driving engagement with the cylindrical surfaces 14 and 16. In the embodiment illustrated, when the race ring 10 is rotated clockwise, as indicated by the arrow, the arcuate faces 19 and 20 rock in frictional contact with the raceways 14 and 16 causing a tilting of each sprag 18 in a counterclockwise direction into wedged positive driving engagement with the raceways 10 and 12. The arcuate gripper faces 19 and 20 are preferably formed about laterally spaced axes and these faces are spaced apart through a maximum distance exceeding that of the radial distance between the coaxial raceways 14 and 16 so that the sprags 18 may be tilted towards generally radial positions for driving engagement but cannot be tilted into or past radial positions wherein an inoperative clutching relation would exist. When the race ring 10 is rotated in an opposite direction to that shown by the arrow, or when the outer race ring 12 overruns the inner race ring in the direction of the arrow, the sprags 18 will rock away from the raceway surfaces 14 and 16 causing the sprags to tilt out of raceway driving engagement and permitting free relative rotation of the race rings 10 and 12.

All of the sprags are correspondingly and simultaneously tilted through the cooperative action of a pair of inner and outer cage rings 22 and 24 which may be formed from a suitably rigid material, as sheet metal. The inner cage ring is generally U-shape in cross section and has a cylindrical wall 25 from whose edges radially extend similar annular flanges 26 and 27. The outer cage ring 24 is slidably journalled on the cylindrical peripheries of the flanges 26 and 27 to maintain both cage rings coaxial and relatively rotatable through a short distance with respect to each other. The inner cage wall 25 has circumferentially spaced generally rectangular through openings 30 and the outer race ring has correspondingly located generally rectangular through openings 32. Each pair of correspondingly located openings 30 and 32 slidably receives a sprag 18 which is generally rectangular in cross section having corresponding substantially parallel side faces 34 and corresponding substantially parallel end faces 35, these faces being slidably engageable with corresponding side and end walls of the cage openings 30 and 32. The interfit of the sprags in these openings is sufficiently close so that the tilting of one sprag will cause a slight relative circumferential movement of the inner and outer cages 22 and 24 which will result in a simultaneous and corresponding tilting movement of all of the sprags in their respective cage openings, thus producing a full phasing operation of the sprags into and out of driving positions.

The sprags are held in unit-handling assembly with both cages 22 and 24 by generally U-shaped guide members 36 and 37, these guide members extending through the opposed flanges 26 and 27. In the illustrated embodiment, the members 36 and 37 may be made from spring wire bent to form. Each guide member 36 is provided with an inwardly extending spring finger 38 extending through a bore in a cage flange and with a cross arm 40 extending through aligned bores in both flanges 26 and 27. Each finger 38 and arm 40 is interconnected by an intermediate portion 41. The guide members 37 are generally similar in shape to the guide members 36 and have corresponding resilient spring fingers 44 and cross arms 45 received in bores in both flanges and respectively interconnected by intermediate portions 47 each of which is longer than the intermediate portion 41 of the guide member 36. The intermediate portions 41 and 47 of each of the guide members are respectively held against the outside of the cage flanges 26 and 27 by means of struck-out lugs 48 and 49 bent over tightly against the intermediate portions 41 and 47 in interlocked relation therewith. The guides 36 are located between adjacent sprags and the guides 37 are longer in extent and straddle two sprags as best shown in Figure 1. Each spring finger 38 and 44 which extends only part way across the space between the cage flanges, has adjacent its inner end a curved offset portion 50 that is laterally sprung against a side 34 of the sprag and which laterally enters within a groove 52 cut in the sprag face 34 thereby urging these sprags in counterclockwise directions and towards clutch-engaging positions. This interfitted relation of the spring fingers in the grooves also locates the sprags 18 in uniform radial projection out of the cages 22 and 24. Hence, when the clutch is installed between the race rings 10 and 12 the cages will be located in coaxial radially spaced relation to the raceways 14 and 16.

To prevent excessive tilting of these sprags when the clutch is disassembled from the race rings, the cross arms 40 and 45 of each of the guide members 36 and 37, extend through both flanges 26 and 27 and serve as stops against which the sprags 18 may engage under the influence of the finger springs 38 and 44. These cross arms 40 and 45 are preferably located in slightly spaced relation to the adjacent sprag faces 34 when the sprags are radial with respect to the cages so that the sprags 18 can never tilt into cross member engagement when the clutch assembly is located in operative position between the raceways 14 and 16. With this arrangement, the sprags 18 may be respectively entered through the outer cage openings 32 and snapped between the adjacent spring fingers and cross arms and slid through the inner cage openings 30 whereupon the spring fingers and offset portions 50 will seat within the grooves 52 to hold the sprags in unit-handling relation with the cage. When installing the unit-handling clutch assembly between the raceways 14 and 16, the cages 22 and 24 are relatively rotated in a clutch releasing direction to tilt the sprags toward non-clutching positions whereupon the assembly may be easily slid between the raceways 14 and 16. Upon release of the cages, the spring fingers 38 and 44 will cooperatively tilt all of the sprags towards operative driving positions, and the sprags will thereafter simultaneously shift in full phasing relation under control of relative raceway rotation due to the interfit of the sprags within corresponding openings in both cages.

I claim:

1. A one-way clutch for driving connection between relatively rotatable annular race members comprising a plurality of circumferentially spaced tiltable grippers arranged to be shifted simultaneously into and out of engagement with the race members, a pair of relatively rotatable annular cages arranged to be received between members and in radially spaced relation to both of said race members and having peripherally spaced openings, the ends of said grippers extending through corresponding openings in each cage and radially beyond each cage for race member engagement, an annular flange on one cage journalled on the other cage to provide for relative coaxial cage rotation, spaced spring members secured to the flange and respectively urging the grippers towards clutch engaging positions, and interfitting portions on the springs and grippers for demountably holding the grippers in unit-handling relation with both cages.

2. A one-way clutch for driving connection between relatively rotatable annular race members comprising a plurality of circumferentially spaced grippers arranged to be simultaneously and correspondingly tiltably shifted into and out of race member engagement, a pair of relatively rotatable annular cages for insertion between the race members and having circumferentially spaced openings therethrough, grippers respectively extending through and generally radially out of corresponding openings in both cages, an annular projection on one cage journalled on the other cage for relative coaxial cage rotation, guiding members in spaced relation and clamped against an outer face of said projection, a spring finger on each guiding member extending through said projection and between the cages in a generally axial direction thereof, and the grippers and spring fingers having detachable interfitting portions which locate grippers in demountable assembly with both cages and which support the cages in radially spaced relation to both race members when installed therebetween.

3. A one-way clutch for driving connection between relatively rotatable annular race members comprising a plurality of circumferentially spaced grippers arranged to be tiltably shifted simultaneously into and out of race member engagement, a pair of coaxial relatively rotatable annular cages for insertion between the race members and having corresponding circumferentially spaced openings therethrough, grippers respectively extending through corresponding openings in both cages, a pair of annular flanges on one cage journalled on the other cage, spaced spring fingers secured to and laterally extending through one flange towards the other flange, and each gripper having a recess that receives a spring finger to urge the grippers towards clutch engaging positions, and the interfitting portions of the spring fingers and grippers holding the clutch parts in unit-handling relation and locating the cages in radially spaced relation to both of said race members.

4. A one-way clutch for driving connection between relatively rotatable annular race members comprising a plurality of circumferentially spaced grippers arranged to be tiltably shifted simultaneously into and out of race member engagement, a pair of relatively rotatable annular cages arranged to be received between the race members in radially spaced relation to said members and having correspondingly positioned circumferentially spaced through openings, each gripper slidably fitting within and extending through corresponding cage openings, a pair of spaced flanges on one cage journalled on the other cage, spaced spring members secured to one flange and extending inwardly of the cages in respective engagement with said grippers and tending to tilt the grippers towards clutch engaging positions, said spring members respectively interfitting with the grippers and supporting both cages in radially spaced relation to both race members, and cross arms extending through the flanges for limiting the tiltable gripper movements.

5. A one-way clutch for driving connection between relatively rotatable annular race members comprising a plurality of circumferentially spaced grippers arranged to be tiltably shifted into and out of race member engagement, a pair of relatively rotatable annular cages for insertion between the race members in radially spaced relation to both race members and having corresponding circumferentially spaced openings therethrough, grippers extending through corresponding openings in both cages, a pair of annular flanges on one cage journalled on the other cage, said relative rotation of the cages providing a simultaneous and corresponding tiltable movement of all of the grippers into and out of race member engagement, a plurality of generally U shaped guiding members for the grippers, means securing the guiding members to one of the cage flanges, each guiding member having a spring finger extending through a cage flange and interfitting with a grooved portion on a gripper to radially space the cages from both race members, each guiding member having a cross arm supported by both flanges and limiting tiltable gripper movements, and the grippers being demountably secured in the cages between said spring fingers.

6. A one-way clutch for driving connection between relatively rotatable annular race members comprising a plurality of circumferentially spaced grippers arranged to be tiltably shifted simultaneously into and out of race member engagement, relatively rotatable annular cages for insertion between the race members, said cages being spaced from both race members and having corresponding circumferentially spaced openings therethrough, grippers extending through corresponding openings in both cages, each gripper having a recess in one of its side walls, a pair of annular flanges on one cage journalled on the other cage, a plurality of generally U shaped guiding members for said grippers, each guiding member having an intermediate portion, clamping means securing the intermediate portions in flange engagement, a spring finger on each guide member resiliently engaging a gripper within one of said recesses to support both cages out of race member engagement, and a cross arm on each guide member extending between both flanges adjacent to each gripper and on the other side of the gripper from that engaged by one of said spring fingers.

7. A one-way clutch for driving connection between relatively rotatable annular race members comprising a plurality of circumferentially spaced grippers arranged to be tiltably shifted simultaneously into and out of race member engagement, a pair of relatively rotatable annular cages for insertion between the race members in radially spaced relation to both of said race members and having circumferentially spaced openings, grippers extending through corresponding openings in both cages, a pair of annular flanges on one cage journalled on the other cage, a series of generally U shaped gripper guiding members fastened to a cage flange, each guiding member being located between adjacent grippers and having a gripper engaging spring finger interfitting with a gripper and a cross arm for limiting the movement of the adjacent gripper, the grippers and spring fingers cooperatively supporting the cages out of race member engagement, a second series of generally U shaped guide members fastened to a cage flange, each of said last mentioned guide members straddling a pair of grippers between which is positioned a first mentioned guide member, and the guide members of said second series each having a gripper engaging spring finger and a cross arm for limiting gripper movement.

References Cited in the file of this patent

UNITED STATES PATENTS

| | | |
|---|---|---|
| 2,399,749 | Lund | May 7, 1946 |
| 2,630,896 | Dodge | Mar. 10, 1953 |
| 2,683,509 | Jandasek | July 13, 1954 |
| 2,724,471 | Dodge | Nov. 22, 1955 |